United States Patent
Jäger et al.

(10) Patent No.: US 11,867,549 B2
(45) Date of Patent: Jan. 9, 2024

(54) DEVICE FOR DETERMINING A FILLING LEVEL OF A LIQUID IN A CONTAINER

(71) Applicant: Micro-Sensys GmbH, Erfurt (DE)

(72) Inventors: Sylvo Jäger, Erfurt (DE); Reinhard Jurisch, Meckfeld bei Bad Berka (DE); Peter Peitsch, Erfurt (DE)

(73) Assignee: MICRO-SENSYS GMBH, Erfurt (DE)

( * ) Notice: Subject to any disclaimer, the term of this patent is extended or adjusted under 35 U.S.C. 154(b) by 24 days.

(21) Appl. No.: 17/534,307

(22) Filed: Nov. 23, 2021

(65) Prior Publication Data
US 2022/0163367 A1   May 26, 2022

(30) Foreign Application Priority Data
Nov. 23, 2020   (DE) .................... 10 2020 214 695.0

(51) Int. Cl.
*G01F 23/18* (2006.01)
*G01F 23/64* (2006.01)
*G01F 23/68* (2006.01)

(52) U.S. Cl.
CPC .............. *G01F 23/18* (2013.01); *G01F 23/64* (2013.01); *G01F 23/68* (2013.01); *G01F 23/686* (2013.01)

(58) Field of Classification Search
CPC .......... G01F 23/18; G01F 23/64; G01F 23/68; G01F 23/686; G01F 23/168; G01F 23/80;
(Continued)

(56) References Cited

U.S. PATENT DOCUMENTS 6,679,055 B1 *   1/2004  Ellis ....................... H01H 61/04
60/527
7,470,060 B1    12/2008  Hoben et al.
(Continued)

FOREIGN PATENT DOCUMENTS

CN         205120211 U  *  3/2016
CN         107576314 A      1/2018
(Continued)

OTHER PUBLICATIONS

European Search Report dated Apr. 8, 2022 for corresponding European application No. 21208438.8 with English translation (14 pages).
(Continued)

*Primary Examiner* — Robert R Raevis
(74) *Attorney, Agent, or Firm* — Intellectual Property Law Group LLP

(57) ABSTRACT

The invention relates to a device (1) for determining a filling level of a liquid (F) in a container (B), comprising a submersible unit (2) having a pressure sensor unit (3) and a transmitter unit (14) configured as a radio transmitter unit, an ultrasonic transmitter unit or a light signal transmitter unit, and a float unit (5) having a further pressure sensor unit (6) and a further transmitter unit (15) configured as a radio transmitter unit, wherein the further pressure sensor unit (6) is arranged at or in a floating body (7) of the float unit (5) in such a manner that, if the float unit (5) is arranged in the liquid (F) for which the device (1) is intended to determine the filling level, the further pressure sensor unit (6) is arranged below the surface (O) of the liquid (F).

11 Claims, 4 Drawing Sheets

(58) Field of Classification Search
CPC ........ G01F 23/14; F17C 13/02; F17C 13/025; F17C 2223/013; F17C 2223/0153; F17C 2223/0161; F17C 2223/0169; F17C 2250/0408; F17C 2250/0413; F17C 2250/0417; F17C 2250/043
USPC .................. 73/299–301, 305, 306, 311–313
See application file for complete search history.

(56) References Cited

U.S. PATENT DOCUMENTS

| | | |
|---|---|---|
| 2006/0261032 A1* | 11/2006 | Krishnamoorthy ......................... G02B 26/0833 216/2 |
| 2009/0108193 A1* | 4/2009 | Kostiainen .......... H01J 49/0018 250/281 |
| 2013/0054159 A1 | 2/2013 | Pennebaker |
| 2014/0264900 A1* | 9/2014 | Feyh .................... H01L 45/146 257/773 |
| 2020/0063693 A1 | 2/2020 | Young |

FOREIGN PATENT DOCUMENTS

| | | |
|---|---|---|
| CN | 210953010 U | 7/2020 |
| DE | 102016210416 A1 | 12/2017 |

OTHER PUBLICATIONS

Germany Office Action, dated Aug. 16, 2021 for corresponding German Application No. DE 10 2020 214 695.0 with English translation (9 pages).

\* cited by examiner

DEVICE FOR DETERMINING A FILLING LEVEL OF A LIQUID IN A CONTAINER

CROSS-REFERENCE TO RELATED APPLICATION

This application claims priority to German application no. DE 10 2020 214 695.0 filed on Nov. 23, 2020, which is hereby incorporated by reference in its entirety.

FIELD OF THE INVENTION

The invention relates to a device for determining a filling level of a liquid in a container.
1.

BACKGROUND

Devices for determining a filling level of a liquid in a container by means of a pressure sensor are generally known in the art.

SUMMARY

The object of the invention is to provide a device for determining a filling level of a liquid in a container which is improved over the prior art.

According to the invention, the object is achieved by a device for determining a filling level of a liquid in a container having the features of claim 1.

Advantageous embodiments are subject of the dependent claims.

According to the invention, a device for determining a filling level of a liquid in a container comprises a submersible unit having a pressure sensor unit and a transmitter unit configured as a radio transmitter unit, an ultrasonic transmitter unit or a light signal transmitter unit. The pressure sensor unit and the transmitter unit are in particular arranged at or in a submersible body of the submersible unit, respectively. Furthermore, according to the invention, the device comprises a float unit having a further pressure sensor unit and a further transmitter unit configured as a radio transmitter unit. The further pressure sensor unit is arranged at or in a floating body of the float unit in such a manner that, if the float unit is arranged in the liquid for which the device is intended to determine the filling level, the further pressure sensor unit is arranged below the surface of the liquid.

It may be provided that pressure values determined by the pressure sensor unit of the submersible unit are transmitted directly to a reader unit. For this purpose, the transmitter unit of the submersible unit may be configured as a radio transmitter unit. In the alternative it may be provided that the pressure values determined by the pressure sensor unit of the submersible unit are transmitted to the float unit. For this purpose, the transmitter unit of the submersible unit may be configured as an ultrasonic transmitter unit or a light signal transmitter unit. In this embodiment of the device, the float unit may comprise a receiver unit configured as an ultrasonic receiver unit or a light signal receiver unit for receiving the pressure values determined by the pressure sensor unit of the submersible unit, i.e. a receiver unit configured as an ultrasonic receiver unit if the transmitter unit of the submersible unit is configured as an ultrasonic transmitter unit, or a receiver unit configured as a light signal receiver unit if the transmitter unit of the submersible unit is configured as a light signal transmitter unit. The receiver unit is in particular configured as a low power receiver unit, i.e. in particular as a receiver unit having low energy consumption. In particular, the receiver unit implements a wake up function, i.e. a wake up and/or activating function, for a rest of the circuit of the float unit.

Pressure values which are for example determined by the further pressure sensor unit of the float unit are transmitted to the reader unit by the further transmitter unit configured as a radio transmitter unit. When the pressure values determined by the pressure sensor unit of the submersible unit are transmitted to the float unit, then these pressure values may be also transmitted to the reader unit by the further transmitter unit of the float unit configured as a radio transmitter unit. In this case as well as in the case that the pressure values determined by the further pressure sensor unit of the float unit are transmitted to the reader unit by the further transmitter unit configured as a radio transmitter unit and that the pressure values determined by the pressure sensor unit of the submersible unit are transmitted directly to the reader unit by the transmitter unit of the submersible unit configured as a radio transmitter unit, a filling level of the liquid in the container may be determined in the reader unit from at least one pressure value determined by the pressure sensor unit of the submersible unit and from at least one pressure value determined by the further pressure sensor unit of the float unit. For this purpose, the reader unit may comprise a suitable determining unit. In the alternative, if the pressure values determined by the pressure sensor unit of the submersible unit are transmitted to the float unit by the transmitter unit of the submersible unit configured as an ultrasonic transmitter unit or a light signal transmitter unit, it may for example be provided that in the float unit, the filling level of the liquid in the container is determined from at least one pressure value determined by the pressure sensor unit of the submersible unit and from at least one pressure value determined by the further pressure sensor unit of the float unit. For this purpose, the float unit may comprise a suitable determining unit. In this case, the filling level of the liquid in the container may be transmitted to the reader unit by the further transmitter unit configured as a radio transmitter unit.

In a possible embodiment of the device, the reader unit is part of the device. It may for example be configured as a mobile phone, in particular a smart phone. In the alternative, the reader unit may be configured as a computer, in particular a notebook or a tablet computer. In a further possible embodiment, the reader unit is configured as a stationary gateway.

The device according to the invention is for example intended for determining a filling level of water in a container, e.g. in a cistern or in a water drum or in a rainwater tank, or for example for determining a filling level of oil in an oil tank, or for determining a filling level of a different liquid in a different container. For example, the device may also be intended for determining a filling level of liquefied gas in a compressed-gas container. The submersible unit is in particular configured in such a way that it dips into the liquid and sinks down to a bottom of the container. Thus, the filling level of the liquid in the container can be determined from the pressure in the area of the bottom of the container determined by the pressure sensor unit of the submersible unit.

The submersible unit is in particular configured such that an average density of the submersible unit is greater, in particular much greater, for example by a multiple greater, in particular at least greater by a double, than a density of the liquid for which the device is intended to determine the filling level. This is in particular true independent of a temperature of the liquid and the submersible unit, i.e. for any temperature which may possibly occur during determination of pressure for determining the filling level.

In particular, the transmitter units of the submersible unit and of the float unit allow for wireless reading of the determined pressure values, such that no wire has to be run through the liquid to the submersible unit and also no wire to the float unit and that the submersible unit and the float unit do not have to be removed from the container for reading out the determined pressure values.

In particular, the float unit ensures a determination of the filling level as exactly as possible since it allows for determining further pressure values in the area of the surface of the liquid in the container in addition to the pressure values determined by the submersible unit. As an alternative to the floating unit, this may for example be carried out in a mobile phone, in particular a smart phone, or in a portable computer, e.g. a tablet or notebook. However, in the solution according to the invention, the device comprises the float unit having the further pressure sensor unit and the further transmitter unit for this purpose. The further pressure sensor unit and the further transmitter unit are in particular arranged at or in the floating body of the float unit.

The float unit is in particular arranged such that it floats at the surface of the liquid in the container. The float unit is in particular arranged such that an average density of the float unit is less, in particular much less, for example by a multiple less, than a density of the liquid for which the device is intended to determine the filling level. This is in particular true independent of a temperature of the liquid and the float unit, i.e. for any temperature which may possibly occur during determination of pressure for determining the filling level.

The transmitter unit of the submersible unit configured as a radio transmitter unit and/or the further transmitter unit of the float unit configured as a radio transmitter unit may be a Bluetooth Low Energy transmitter unit, i.e. it is suitably arranged and configured to facilitate transmission of the determined pressure values or the determined further pressure values or the determined filling level, respectively, by Bluetooth Low Energy (BLE). In an exemplary embodiment, both the transmitter unit of the submersible unit configured as a radio transmitter unit and the further transmitter unit of the float unit configured as a radio transmitter unit are suitably configured. This way, sufficient radio coverage is ensured in order to be able to reliably read out in particular also the submersible unit, also through the liquid and also at greater depths of the submersible unit dipped in the liquid on the one hand; and a low energy consumption for the radio transmission is ensured on the other hand.

In another embodiment, e.g. Bluetooth, Beacon, Zigbee, LoRa, also referred to as LoRaWAN (Long Range Wide Area Network) or another, also proprietary radio technology may be provided as a radio technology for the transmitter unit of the submersible unit configured as a radio transmitter unit and/or for the further transmitter unit of the float unit configured as a radio transmitter unit. In an exemplary embodiment, a low power radio technology is provided, i.e. a radio technology having low energy consumption.

For operating the respective pressure sensor unit and transmitter unit, in particular for determining and transmitting the respective pressure values or the determined filling level, the submersible unit and the float unit may comprise an electric energy source in each case, in particular at least one battery and/or at least one accumulator, i.e. a rechargeable battery.

As mentioned above, the further pressure sensor unit is arranged at or in the floating body of the float unit in such a way that it is arranged below the surface of the liquid if the if the float unit is arranged in the liquid for which the device is intended to determine the filling level. For example, it is arranged at an underside or in the area of an underside of the floating body. This way it is ensured that both the pressure sensor unit in the submersible unit and the further pressure sensor unit in the float unit are permanently, at least to the greatest possible extent, exposed to the same conditions. The conditions to which the pressure sensor units are exposed influence in particular an aging and a sensor drift of the pressure sensor units. As these pressure sensor units in this embodiment of the device are exposed to, at least to the greatest possible extent, the same conditions, they exhibit a, at least to the greatest possible extent, equal aging and sensor drift accordingly, so that errors regarding determination of the filling level due to differences in aging and sensor drift of the two pressure sensor units are prevented. Moreover, dipping the further pressure sensor unit of the float unit into the liquid ensures that the determination of pressure of both pressure sensor units occurs at the same temperature or at least at a temperature which is the same to the greatest possible extent, such that influence of the temperature on the determination of the filling level is also prevented.

In an exemplary embodiment, the pressure sensor units of the float unit and the submersible unit are formed equally, e.g. identically. In an exemplary embodiment, they in particular have the same sensor characteristic line and the same sensor drift.

In an exemplary embodiment, the floating body of the float unit and the submersible body of the submersible unit are equal, in particular identical. This way production is facilitated and more cost efficient. The difference in the average density between the float unit and the submersible unit is for example achieved by the fact that the float unit, in particular its floating body, is for example filled with more gas or gas mixture, in particular air, than the submersible unit, in particular its submersible body, and that the submersible unit, in particular its submersible body, is filled with more of a medium whose density is greater, in particular much greater, for example by a multiple greater, in particular at least greater by a double, than the density of the liquid for which the device is intended to determine the filling level, in particular independent of a temperature of the liquid and the submersible unit; i.e. this is in particular true for any temperature which may possibly occur during determination of pressure for determining the filling level. This medium for filling the submersible unit, in particular its submersible body, is for example a potting, in particular an epoxy resin. By means of this potting, all components arranged within the submersible body may be safely fixed, in particular the transmitter unit and the pressure sensor unit, by partially or completely casting them in with the potting, i.e. embedding them therein. This casting may also be carried out with the components arranged in the floating body, however less potting is used for this in order to ensure the sufficiently low average density of the float unit as described above. In addition, a sufficient space for the gas or gas mixture, in particular air, remains this way in order to ensure this sufficiently low average density of the float unit. Appropriately more potting is filled into the submersible unit thus displacing more air from the submersible unit thereby ensuring the sufficiently high average density of the submersible unit as described above.

In a possible embodiment of the device, the pressure sensor unit and/or the further pressure sensor unit are/is configured as a MEMS sensor. In an exemplary embodiment, both pressure sensor units are respectively configured as a MEMS sensor, i.e. a micro system (MEMS=microelectromechanical system). This allows for a particularly small design of the submersible unit or the float unit, respectively. In other embodiments of the device, the pressure sensor unit and/or the further pressure sensor unit may be provided as a piezo resistive pressure sensor unit; in particular, a pressure sensor of the pressure sensor unit and/or a pressure sensor of the further pressure sensor unit may be provided as a piezo resistive pressure sensor.

In a possible embodiment, the pressure sensor unit and/or the further pressure sensor unit are/is at least in sections formed from a magnetizable material, in particular a magnetizable metal. For example, this allows for removal from the container in a simple way, e.g. using a magnet at a fishing rod or a similar tool. In particular for the submersible unit, this is particularly advantageous since this way, manual submersion into the liquid and down to the bottom of the container is not required to access and remove the submersible unit.

The float unit, in particular its floating body, is for example at least in part filled with a gas or gas mixture, in particular air, as described above. This way, floating of the floating unit at the surface of the liquid is ensured in a simple way.

In a possible embodiment, the submersible unit and/or the float unit comprise/comprises a clock, in particular a low energy clock, also referred to as a low power clock, in particular a real time clock. In an exemplary embodiment, the submersible unit and/or the float unit comprise/comprises a memory unit, in particular for storing determined pressure values, in particular together with a respective point in time of the determination. In the floating unit, the memory unit may alternatively or in addition be provided for storing determined filling levels, in particular together with a respective point in time of the determination. In an exemplary embodiment, both the submersible unit and the float unit comprise such a clock and optionally such a memory unit, respectively. This way, pressure values may be determined and stored and only be read at a later point in time, wherein, due to the storage of the determined pressure values together with the respective point in time of the determination, mapping of the determined pressure values of the submersible unit and the float unit to one another may be ensured, and in addition, it may be retraced what filling level of the liquid existed in the container at what point in time. Likewise, it may for example be provided that only the submersible unit comprises a real time clock and/or that only the float unit comprises a memory unit.

In an exemplary embodiment, as described above, the device comprises the reader unit for reading the pressure values determined by the pressure sensor unit of the submersible unit and/or by the further pressure sensor unit of the float unit, optionally both for reading the pressure values determined by the pressure sensor unit of the submersible unit and by the further pressure sensor unit of the float unit, and/or for reading the determined filling level from the float unit. For this purpose, this reader unit may comprise a radio unit corresponding to the transmitter unit of the submersible unit configured as a radio transmitter unit and/or corresponding to the further transmitter unit of the float unit configured as a radio transmitter unit, in particular a radio receiver unit, in particular a Bluetooth Low Energy receiver unit, i.e. a radio receiver unit suitably arranged and configured to facilitate reception of the determined pressure values or the determined further pressure values by Bluetooth Low Energy (BLE), respectively, or a radio receiver unit having one of the radio technologies mentioned above with regard to the transmitter units. For example, this reader unit is configured as a mobile phone, in particular a smart phone, or as a portable computer, e.g. a tablet or notebook. In a further possible embodiment, the reader unit is configured as a stationary gateway.

The respective transmitter unit mentioned above may in particular also be configured as a receiver unit at the same time, i.e. the radio transmitter unit also as a radio receiver unit at the same time, the ultrasonic transmitter unit also as an ultrasonic receiver unit at the same time, and the light signal transmitter unit also as a light signal receiver unit at the same time. Likewise, the respective receiver unit mentioned above, in particular the radio receiver unit of the reader unit and/or the ultrasonic receiver unit or the light signal receiver unit of the float unit may also be configured as a respective transmitter unit at the same time. This allows for bidirectional communication between the reader unit and the float unit, between the reader unit and the submersible unit and/or between the float unit and the submersible unit. In particular, this allows for example for the option that a transmission from the float unit and/or the submersible unit to the reader unit occurs only as a reaction upon a respective request from the reader unit to the float unit and/or to the submersible unit, and/or that a transmission from the float unit to the submersible unit occurs only as a reaction upon a respective request from the float unit to the submersible unit.

In an exemplary embodiment, the float unit and the submersible unit respectively comprise a temperature sensor. For example, the respective pressure sensor unit is configured as a combined pressure and temperature sensor unit, i.e. it comprises a pressure sensor and a temperature sensor. This way for example, the submersible unit not only transmits determined pressure values but also related determined temperature values to the reader unit and/or to the float unit. In addition for example, an unambiguous identification of the submersible unit is transmitted from the submersible unit to the reader unit and/or to the float unit. Likewise for example, the float unit not only transmits determined pressure values of the float unit, but also related determined temperature values of the float unit to the reader unit. In addition for example, an unambiguous identification of the float unit is transmitted from the float unit to the reader unit. If the pressure values, the temperature values and the unambiguous identification of the submersible unit have been transmitted from the submersible unit to the float unit, then these measurements are likewise transmitted from the float unit to the reader unit, respectively. This way, the temperature may also be taken into account when determining the filling level, either in the reader unit or in the float unit.

If the filling level is determined in the float unit, then for example only the determined filling level is transmitted to the reader unit, for example along with the unambiguous identification of the float unit and/or the submersible unit.

BRIEF DESCRIPTION OF THE DRAWINGS

In the following, embodiments of the invention are described in more detail with reference to drawings.

Corresponding parts are provided with the same reference signs in all figures.

DETAILED DESCRIPTION OF SPECIFIC EMBODIMENTS

Figure 1:
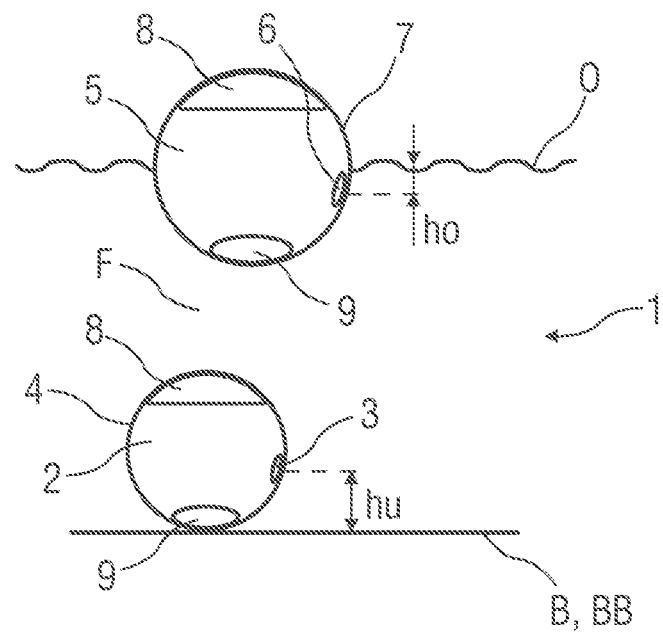
FIG. 1 is a schematic view of an embodiment of a device for determining a filling level of a liquid in a container, comprising a submersible unit and a float unit.
Figure 6:
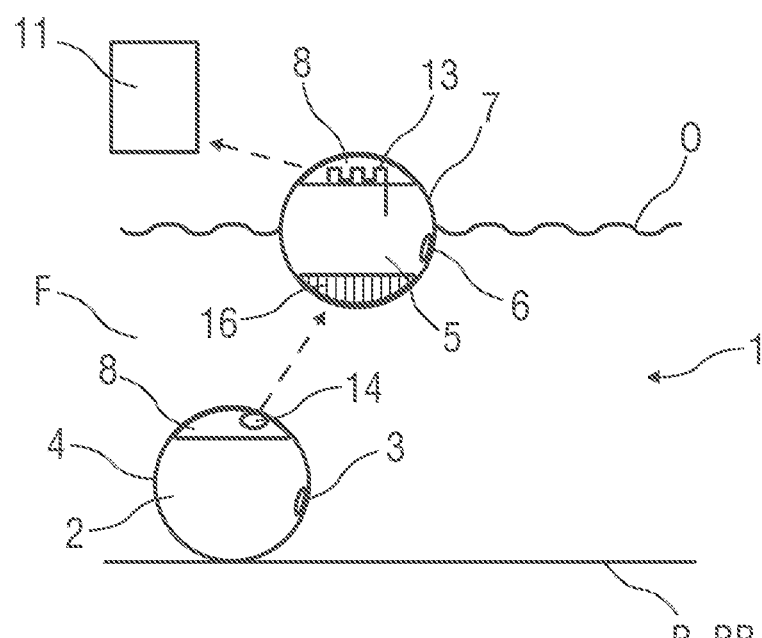
FIG. 6 is a schematic view of a further variant of the device with a transmitter unit configured as an ultrasonic transmitter unit or a light signal transmitter unit in the submersible unit.
Figure 7:
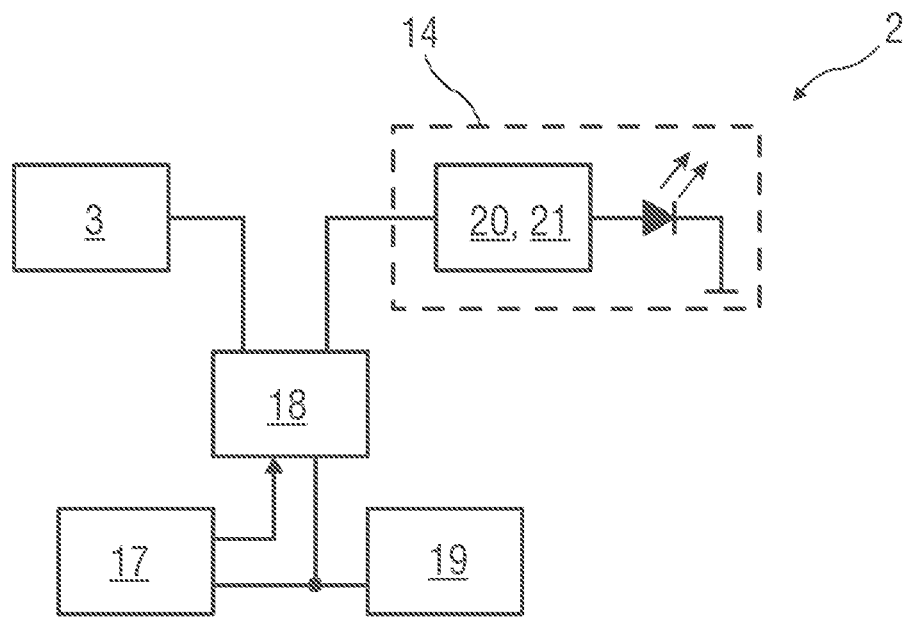
FIG. 7 is a schematic circuit diagram of the submersible unit of the variant of the device according to FIG. 6.

FIG. 1 is a schematic view of an exemplary embodiment of a device 1 for determining a filling level of a liquid F in a container B. The device 1 comprises a submersible unit 2 having a pressure sensor unit 3 and a transmitter unit 14 configured as a radio transmitter unit, as an ultrasonic transmitter unit or as a light signal transmitter unit, in particular for transmitting pressure values determined by means of the pressure senor unit 3. The pressure senor unit 3 and the transmitter unit 14 are arranged in a submersible body 4 of the submersible unit 2. The transmitter unit 14 is schematically shown in FIGS. 6 and 7.

Moreover, the device 1 of the embodiment shown here comprises a float unit 5 having a further pressure sensor unit 6 and a further transmitter unit 15 configured as a radio transmitter unit. This further transmitter unit 15 may be provided for transmitting pressure values determined by means of the further pressure sensor unit 6, and, for example in addition, for transmitting pressure values determined by means of the pressure sensor unit 3 of the submersible unit 2 and transmitted to the float unit 5. In the alternative or in addition, this further transmitter unit 15 may for example be provided for transmitting a filling level h determined from a pressure value determined by means of the pressure sensor unit 3 of the submersible unit 2 and transmitted to the float unit 5 and a (pressure value determined) by means of the further pressure sensor unit 6 of the float unit 5 in the float unit 5. The further pressure sensor unit 6 and the further transmitter unit 15 are in particular arranged on or in a floating body 7 of the float unit 5, respectively. The further transmitter unit 15 is exemplarily schematically shown in FIG. 8.

The device 1 is for example intended for determining a filling level of water in a cistern or in a water drum or in a rainwater tank, or for example for determining a filling level of oil in an oil tank, or for determining a filling level of a different liquid F in a different container B. The submersible unit 2 is in particular configured in such a way that it dips into the liquid F and sinks down to a bottom BB of the container B within the liquid F as shown in FIG. 1.

The submersible unit 2 is in particular configured such that an average density of the submersible unit 2 is greater, in particular much greater, for example by a multiple greater, in particular at least greater by a double, than a density of the liquid F for which the device 1 is intended to determine the filling level. This is in particular true independent of a temperature of the liquid F and the submersible unit 2, i.e. for any temperature which may possibly occur during determination of pressure for determining the filling level.

The float unit 5 is in particular arranged such that it floats at the surface O of the liquid F in the container B as likewise shown in FIG. 1. The float unit 5 is in particular arranged such that an average density of the float unit 5 is less, in particular much less, for example by a multiple less, than a density of the liquid F for which the device 1 is intended to determine the filling level. This is in particular true independent of a temperature of the liquid F and the float unit 5, i.e. for any temperature which may possibly occur during determination of pressure for determining the filling level.

The transmitter unit 15 of the submersible unit 5 configured as a radio transmitter unit is a Bluetooth Low Energy transmitter unit, i.e. it is suitably arranged and configured to facilitate transmission of the pressure values determined by the pressure sensor unit of the float unit 5 and for example likewise the pressure values determined by the pressure sensor unit 3 of the submersible unit 2 and transmitted to the float unit 5, and/or transmission of the determined filling level h, by Bluetooth Low Energy (BLE). If the transmitter unit 14 of the submersible unit 2 is configured as a radio transmitter unit, then this radio transmitter unit also is a Bluetooth Low Energy transmitter unit, i.e. it is suitably arranged and configured to facilitate transmission of the pressure values determined by the pressure sensor unit 3 of the submersible unit 2 by Bluetooth Low Energy (BLE).

In order to operate the respective pressure sensor unit 3, 6 and transmitter unit 14, 15, in particular for determining and transmitting the respective pressure values, the submersible unit 2 and the float unit 5 may comprise an electric energy source respectively, in particular at least one battery 19, 23 and/or at least one accumulator, i.e. a rechargeable battery 19, 23.

In the embodiment shown in FIG. 1, both the submersible unit 2 and the float unit 5 has a spherical shape. Likewise, other shapes are possible, e.g. a rod shape or an ellipsoid shape. For example, the float unit 5, in particular its floating body 7, is filled at least in part with a gas or gas mixture, in particular air; this is presently shown by a gas bubble 8, in particular air bubble, in an upper area of the float unit 5. A lower area of the float unit 5 is for example formed of a material 9 and/or filled with a material 9 with a high density which is greater, in particular much greater, in particular by a multiple greater, for example at least greater by a double, than the density of the liquid F for which the device 1 is intended to determine the filling level. This way, a stable floating orientation of the float unit 5 at the surface O of the liquid F is achieved. In particular, rotation of the float unit 5 about its vertical rotational axis and thus a change of height of the further pressure sensor unit 6 is avoided.

Moreover this way, the further pressure sensor unit 6 is arranged below the surface O of the liquid F. I.e. the float unit 5 is configured and the further pressure sensor unit 6 is arranged on or in the floating body 7 of the float unit 5 in such a way, that, if the float unit 5 is arranged in the liquid F, for which the device 1 is intended to determine the filling level, this further pressure sensor unit 6 is arranged below the surface O of the liquid F as shown in FIG. 1.

The material 9 may for example be the at least one (for example rechargeable) further battery 23, which for this purpose is deliberately positioned in this lower area of the float unit 5, in particular in order to lower a center of gravity of the float unit 5 this way.

In the illustrated embodiment, the submersible unit 2 is also partially filled with a gas or gas mixture, in particular air; this is presently likewise shown by a gas bubble 8 in an upper area of the submersible unit 2. Likewise in the submersible unit 2, a lower area is for example formed of a material 9 and/or filled with a material 9 with a high density, in particular with a density greater, in particular much greater, in particular by a multiple greater, for example at least greater by a double, than the density of the liquid F for which the device 1 is intended to determine the filling level. This way, a stable orientation of the submersible unit 2 and thus of its pressure sensor unit 3 is achieved. In particular, rotation of the submersible unit 2 about its vertical rotational axis and thus a change of height of the pressure sensor unit 3 is avoided this way.

Also in this case, the material 9 may for example be the at least one (for example rechargeable) battery 19 and/or the at least one accumulator, which for this purpose is deliberately positioned in this lower area of the submersible unit 2, in particular in order to lower a center of gravity of the submersible unit 2 this way.

In the embodiment shown in FIG. 1, the floating body 7 of the float unit 5 and the submersible body 4 of the submersible unit 2 may be equal, in particular identical. This way production is facilitated and more cost efficient. The difference in the average density between the float unit 5 and the submersible unit 2 is for example achieved by the fact that the float unit 5, in particular its floating body 7, is for example filled with more gas or gas mixture, in particular air, than the submersible unit 2, in particular its submersible body 4, and that the submersible unit 2, in particular its submersible body 4, is filled with more of a medium whose density is greater, in particular much greater, for example by a multiple greater, in particular at least greater by a double, than the density of the liquid F for which the device 1 is intended to determine the filling level, in particular independent of a temperature of the liquid F and the submersible unit 2; i.e. this is in particular true for any temperature which may possibly occur during determination of pressure for determining the filling level.

This medium for filling the submersible unit 2, in particular its submersible body 4, is for example a potting, in particular an epoxy resin. By means of this potting, all components arranged within the submersible body 4 may be safely fixed, in particular the transmitter unit 14 and the pressure sensor unit 3, by partially or completely casting them in with the potting, i.e. embedding them therein.

This casting may also be carried out with the components arranged in the floating body 7 of the float unit 5, however less potting is used for this in order to ensure the sufficiently low average density of the float unit as described above. In addition, a sufficient space for the gas or gas mixture, in particular air, remains this way in order to ensure this sufficiently low average density of the float unit 5. Appropriately more potting is filled into the submersible unit 2 into its submersible body 4 thus displacing more air from the submersible unit 2, i.e. from its submersible body 4, thereby ensuring the sufficiently high average density of the submersible unit 2 as described above.

In an exemplary embodiment, the submersible unit 2, in particular its submersible body 4, is at least in sections formed from a magnetizable material, in particular a magnetizable metal. This way, removal of the submersible unit 2 from the liquid F and from the container B by means of a magnet is allowed in a simple way, which magnet may for example be arranged at a fishing rod or a similar suitable tool for this purpose.

Figure 2:
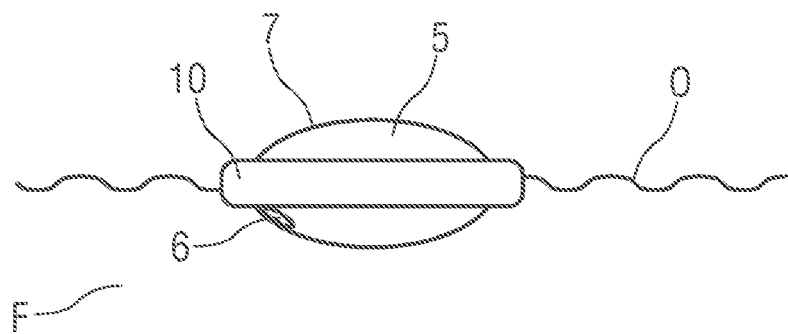
FIG. 2 is a schematic view of an alternative embodiment of the float unit.

FIG. 2 shows another embodiment of the float unit 5. This embodiment of the float unit 5 is formed lenticular or cylindrical. Aside from this, its design may be as described above regarding the float unit 5. In an exemplary embodiment, it comprises an upper light area and a lower heavy area, in particular due to the above described design, such that it stably floats at the surface O of the liquid F. For this purpose, it additionally comprises a swimming ring 10 in order to improve its floating characteristics, i.e. a structure extending in a ring shape around the floating body 7, a material of the structure having a density, in particular average density which is less, in particular much less, for example by a multiple less, than the density of the liquid F for which the device 1 is intended to determine the filling level. This is in particular true independent of a temperature of the liquid F and the swimming ring 10, i.e. for any temperature which may possibly occur during determination of pressure for determining the filling level.

Likewise, this embodiment of the float unit 5 is configured and the further pressure sensor unit 6 is arranged on or in the floating body 7 of this embodiment of the float unit 5 in such a way, that, if the float unit 5 is arranged in the liquid F, for which the device 1 is intended to determine the filling level, this further pressure sensor unit 6 is arranged below the surface O of the liquid F.

Figure 3:
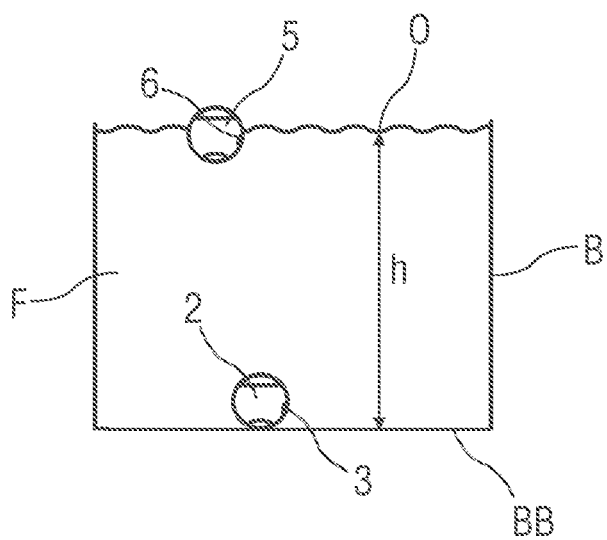
FIG. 3 is a schematic view of a calculation of the filling level.

Based on FIG. 3, the basics of the determination of the filling level by means of the device 1 are briefly explained in the following.

The pressure p in the liquid F at the bottom BB of the container B is given by:

$$p = \rho * g * h + p_0 \qquad (1)$$

Herein, $\rho$ is the density of the liquid F, which is known for the respective liquid F, e.g. water, and thus given, e.g. for a predetermined temperature, e.g. an average temperature from a temperature range possible for the respective measurement situation, g is the gravity of approximately 9.81 m/s$^2$, also referred to as gravitational acceleration, h is the filling level $p_0$ is the air pressure.

The pressure p in the liquid F at the bottom BB of the container B or at least in the area of the bottom BB of the container B is determined by means of the pressure sensor unit 3 of the submersible unit 2 as will be explained in the following. The air pressure $p_0$ at the surface O of the liquid F or at least the pressure below and in the area of the surface O of the liquid F is determined by means of the further pressure sensor unit 6 of the float unit 5 as will also be explained in the following.

As can be seen in FIG. 1, the pressure sensor unit 3 of the submersible unit 2 is not exactly positioned at the bottom BB of the container B when the submersible unit 2 rests on the bottom BB of the container B, but at a height hu above the bottom BB, such that the pressure sensor unit 3 of the submersible unit 2 does not determine the pressure p in the liquid F at the bottom BB of the container B but a pressure $p_3$ in the liquid F at the height hu above the bottom BB. Likewise, the further pressure sensor unit 6 of the float unit 5 is not exactly positioned at the surface O of the liquid F when the float unit 5 floats at the surface O of the liquid F, but at a height ho below the surface O of the liquid F, such that the further pressure sensor unit 6 of the float unit 5 does not determine the air pressure $p_0$ at the surface O of the liquid F but a pressure $p_6$ below and in the area of the surface O of the liquid F, i.e. at the height ho below the surface O of the liquid F. However, as the height hu and the height ho are known and constant due to the predetermined design of the submersible unit 2 and the float unit 5, they can thus be eliminated when calculating the filling level h of the liquid F in the container B. In particular, the height hu and the height ho may be added to the calculated filling level h.

The filling level h of the liquid F in the container B may thus be determined by converting the equation (1), using the pressure $p_3$ instead of the pressure p, using the pressure $p_6$ instead of the air pressure $p_0$ and adding the heights hu and ho to the filling level h:

$$h = \frac{p_3 - p_6}{\rho * g} + hu + ho \qquad (2)$$

The two pressure sensor units 3, 6 have cross sensitivities which are in particular temperature dependent. Moreover, both pressure sensor units 3, 6 which may be equal, in particular identical, are subject to deterioration, wherein this deterioration depends on the conditions that the pressure sensor units 3, 6 are exposed to. Due to the configuration of the float unit 5 in such a way that the further pressure sensor unit 6 is arranged below the surface O of the liquid F, in particular due to the respective arrangement of the further pressure sensor unit 6 at the floating body 7 of the float unit 5, it is achieved that both pressure sensor units 3, 6 are arranged below the surface O of the liquid F, i.e. arranged in the liquid and thus surrounded by the liquid F, such that the temperature in the liquid F for both pressure sensor units 3, 6 is equal or at least approximately equal, and likewise, the conditions of deterioration for both pressure sensor units 3, 6 are equal or at least approximately equal. Thus, for example the sensor drifts of both pressure sensor units 3, 6 are equal or at least approximately equal and may eliminate each other. Therefore, deterioration and temperature effects which could adversely affect, in particular distort, the determination of the filling level, can be avoided or at least essentially avoided.

Figure 5:
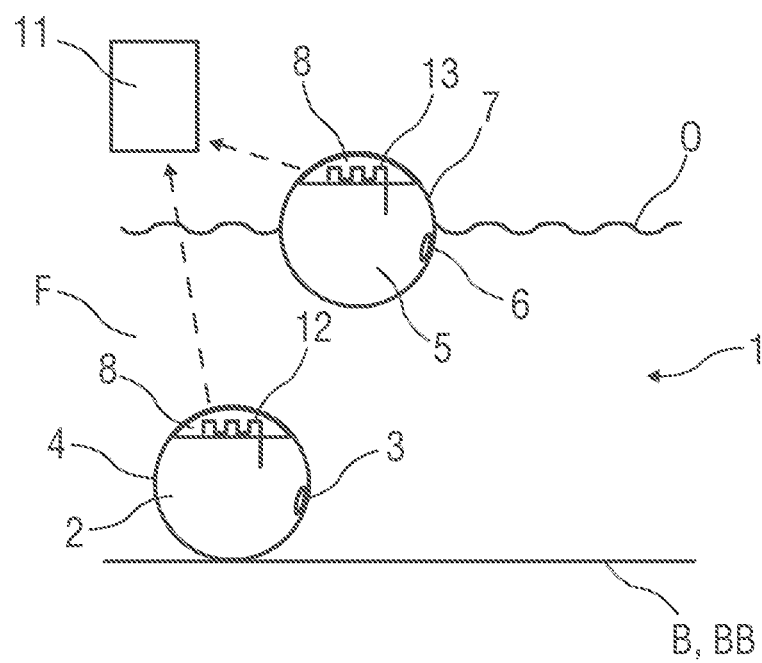
FIG. 5 is a schematic view of a variant of the device with transmitter units configured as radio transmitter units in the submersible unit and in the float unit.

In addition to the submersible unit 2 and the float unit 5, the device 1 may comprise a reader unit 11, schematically exemplarily shown in FIGS. 5 and 6, for reading the pressure values determined by means of the pressure sensor unit 3 of the submersible unit 2 and by means of the further pressure sensor unit 6 of the float unit 5. For this purpose, this reader unit 11 may likewise comprise a Bluetooth Low Energy (BLE) transmitter unit, i.e. a receiver unit, in particular radio receiver unit, suitably arranged and configured to facilitate reception of the pressure values determined by the pressure sensor units 3, 6 of the submersible unit 2 and the float unit 5 and/or of the determined filling level h by Bluetooth Low Energy (BLE). For example, this reader unit 11 is configured as a mobile phone, in particular a smart phone, or as a portable computer, e.g. a tablet or notebook; or it is configured as a stationary gateway.

Figure 4:
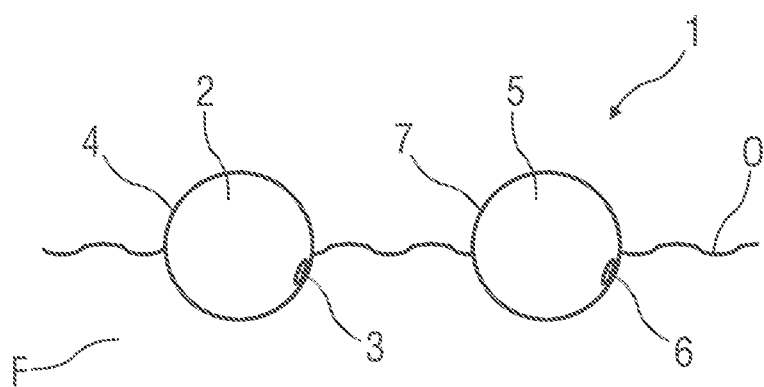
FIG. 4 is a schematic view of a zero balance of the float unit and the submersible unit.

Calibration and initialization of the submersible unit 2, in particular its pressure sensor unit 3, and the float unit 5, in particular its further pressure sensor unit 6, may be carried out by means of a program, e.g. by means of an app, on the reader unit 11, e.g. on the mobile phone, in particular smart phone. For this purpose, a zero balance of the float unit 5 and the submersible unit 2, in particular their pressure sensor units 6, 3, is for example carried out as shown in FIG. 4. For this zero balance, both the float unit 5 and the submersible unit 2 are maintained at the surface O of the liquid F, in particular at equal height, in particular relative to the surface O of the liquid F. Herein, both sensors 3, 6 may determine a pressure value. These pressure values may then be registered in the program, in particular in the app, as a zero point. In the alternative or in addition, these pressure values may for example be compared to one another, and/or the two pressure sensor units 3, 6 may for example be calibrated and/or adjusted based on these pressure values and/or based on this comparison, in particular in case of differences between the two determined pressure values.

In the alternative or in addition, both the float unit 5 and the submersible unit 2 are for example dipped, i.e. submersed into the liquid F down to a predetermined, equal immersion depth, in particular with regard to the pressure sensors 6, 3. This immersion depth may be entered into the program, in particular into the app.

In a possible embodiment, the submersible unit 2 and/or the float unit 5 comprise a clock in each case, in particular a low energy clock, also referred to as a low power clock, in particular a real time clock, and optionally in addition a memory unit for storing determined pressure values along with a respective point in time of the determination. This allows for a data logger function of the submersible unit 2 and the float unit 5, in particular for an automatic determination of the respective pressure value at predetermined points in time, for example at a predetermined time interval of for example ten minutes, and for storing the respectively determined pressure value along with the point in time of the determination. These overall data, i.e. pressure values and their points in time of the determination, may then be read out at a later point in time, in particular by means of the reader unit 11 and/or, with regard to the pressure values and points in time of the determination of the submersible unit 2, by means of the float unit 5, wherein for example a filling level progression may be determined based on these overall data, i.e. the pressure values and their temporal correlation.

FIG. 5 shows a variant of the device 1, in which both the further transmitter unit 15 of the float unit 5 and the transmitter unit 14 of the submersible unit 2 are configured as a radio transmitter unit. Here, an antenna 12, 13 of the respective transmitter unit 14, 15 configured as a radio transmitter unit is shown. This antenna 12, 13 may be arranged in a cavity filled with gas or a gas mixture, in particular air, of the floating body 7 or the submersible body 4, respectively; in the embodiment shown here, in the gas bubble 8.

Furthermore, the reader unit 11 is shown here, for example the smart phone, which comprises a suitable receiver unit, in particular radio receiver unit. In this variant, the pressure values determined by the further pressure sensor unit 6 of the float unit 5 and e.g. also temperature values determined by a temperature sensor of the float unit 5 and e.g. also an unambiguous identification of the float unit 5 are transmitted to the reader unit 11 by means of the further transmitter unit 15 configured as a radio transmitter unit of the float unit 5. Furthermore, the pressure values determined by the pressure sensor unit 3 of the submersible unit 2 and e.g. also temperature values determined by a temperature sensor of the submersible unit 2 and e.g. also an unambiguous identification of the submersible unit 2 are transmitted directly to the reader unit 11 by means of the transmitter unit 14 configured as a radio transmitter unit of the submersible unit 2. Subsequently, the filling level h is determined from these pressure values in the reader unit 11, e.g. by taking account of the temperature values. The reader unit 11 comprises a suitable determination unit for this purpose.

FIG. 6 shows a further variant of the device 1, in which the transmitter unit 14 of the submersible unit 2 is configured as an ultrasonic transmitter unit or a light signal transmitter unit. The light signal transmitter unit comprises for example at least one LED (light-emitting diode). In this variant of the device 1, the float unit 5 comprises a receiver unit 16 configured as an ultrasonic receiver unit or a light signal receiver unit. I.e., if the transmitter unit 14 of the submersible unit 2 is configured as an ultrasonic transmitter unit, then the receiver unit 16 of the float unit 5 is configured as an ultrasonic receiver unit, and if the transmitter unit 14 of the submersible unit 2 is configured as a light signal transmitter unit, then the receiver unit 16 of the float unit 5 is configured as a light signal receiver unit. The light signal receiver unit is for example configured as a photodiode or comprises such a photodiode. The receiver unit 16 is in particular configured as a low power receiver unit, i.e. in particular as a receiver unit 16 having low energy consumption. In particular, the receiver unit 16 implements a wake up function, i.e. a wake up and/or activating function, for the rest of the circuit of the float unit 5.

Furthermore, the reader unit 11 is shown here, for example the smart phone, which comprises a receiver unit, in particular radio receiver unit. In this variant, the pressure values determined by the pressure sensor unit 3 of the submersible unit 2 and e.g. also temperature values determined by a temperature sensor of the submersible unit 2 and e.g. also an unambiguous identification of the submersible unit 2 are transmitted to the float unit 5 by means of the transmitter unit 14 of the submersible unit 2 configured as an ultrasonic transmitter unit or light signal transmitter unit.

For example, it may be provided that these pressure values and e.g. also the temperature values and e.g. also the unambiguous identification of the submersible unit 2 are transmitted to the reader unit 11 together with the pressure values determined by the further pressure sensor unit 6 of the float unit 5 and e.g. also the temperature values determined by the temperature sensor of the float unit 5 and e.g. also the unambiguous identification of the float unit 5 are transmitted to the reader unit 11 by means of the further transmitter unit 15 configured as a radio transmitter unit of the float unit 5. In this case, the filling level h is determined from these pressure values in the reader unit 11, e.g. by taking account of the temperature values. The reader unit 11 comprises a suitable determination unit for this purpose.

In the alternative it may for example be provided that the filling level h is determined from these pressure values in the float unit 5, e.g. by taking account of the temperature values. The float unit 5 comprises a suitable determination unit for this purpose. In this case for example, only the determined filling level h, optionally together with the unambiguous identification of the float unit 5 and/or the submersible unit 2, is transmitted to the reader unit 11 by means of the further transmitter unit 15 of the float unit 5 configured as a radio transmitter unit. For example, the determined pressure values and/or temperature values of the float unit 5 and/or of the submersible unit 2 may be transmitted in addition to the reader unit 11 this way.

In this variant of the device 1 shown in FIG. 6, it may thus be provided that the filling level h is determined in the reader unit 11 and/or in the float unit 5.

The configuration of the transmitter unit 14 of the submersible unit 2 as an ultrasonic transmitter unit or a light signal transmitter unit and the provision of a corresponding receiver unit 16 at the float unit 5 in particular comes with the advantage of a safe transmission through the liquid F, in particular even with a high filling level h and/or with a liquid F which would strongly attenuate radio signals.

Figure 8:
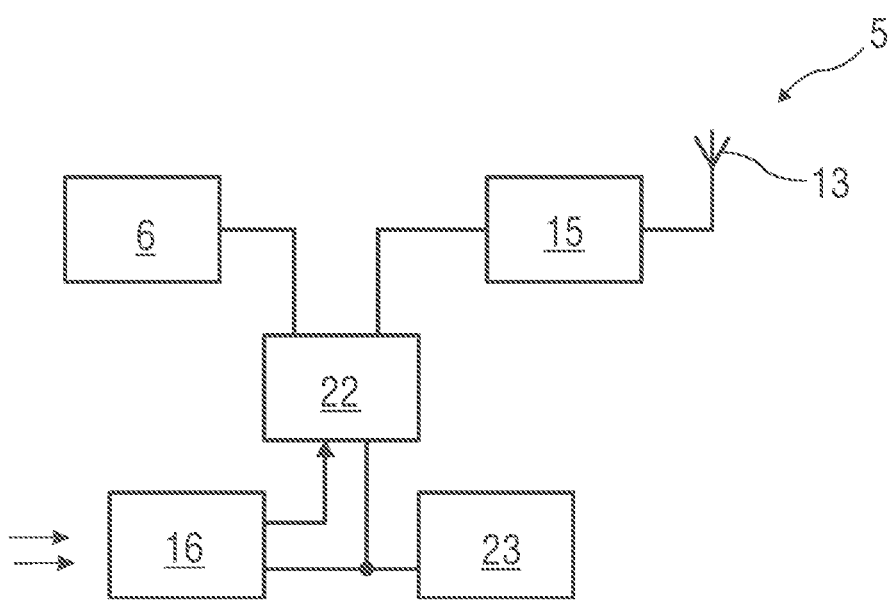
FIG. 8 is a schematic circuit diagram of the float unit of the variant of the device according to FIG. 6.

FIG. 7 is a schematic circuit diagram of the submersible unit 2 of the variant of the device 1 according to FIG. 6, and FIG. 8 is a schematic circuit diagram of the float unit 5 of the variant of the device 1 according to FIG. 6.

The submersible unit 2 shown in FIG. 7 comprises the pressure sensor unit 3, the clock 17 which is in particular configured as a low power clock, a controller 18, the battery 19 which may also be rechargeable, and the transmitter unit 14 configured as an ultrasonic transmitter unit or a light signal transmitter unit. The transmitter unit 14 comprises for example an ultrasonic or LED driver 20 and a modulator 21. In the illustrated example, an LED of the transmitter unit 14 is shown which is suitably configured as a light signal transmitter unit. In case of a transmitter unit 14 configured as an ultrasonic transmitter unit, an ultrasonic emitter device would be shown instead of the LED. The clock 17 is for example configured as a real time clock.

The float unit 5 shown in FIG. 8 comprises the further pressure sensor unit 6, a further controller 22, the further battery 23 which may also be rechargeable, the receiver unit 16 configured as an ultrasonic receiver unit or as a light signal receiver unit, and the further transmitter unit 15 configured as a radio transmitter unit. The further controller 22 may also form the determination unit here if the filling level h is determined in the float unit 5.

The mode of operation of this variant of the device 1 is for example as follows:

In an idle state of the submersible unit 2 only its clock 17 is working, thus achieving very low energy consumption. For example, the clock 17 may be operated with a current of less than 1 µA. The clock 17, using a, e.g. freely programmable, clock rate of e.g. a second up to one minute, sends a so called wake up signal, i.e. a wake up and/or activating signal to the controller 18, whereupon the controller becomes active. Now, the pressure sensor unit 3 measures the pressure and the controller 18 forwards the determined pressure value to the transmitter unit 14. This takes place within a very short time, e.g. within less than 100 ms.

The transmitter unit 14 transmits the determined pressure value to the float unit 5. E.g. for this purpose, it firstly transmits a wake up signal, i.e. a wake up and/or activating signal. By receiving this wake up and/or activating signal, the float unit 5 is initially activated. For this purpose, the receiver unit 16 implements a wake up function for the rest of the circuit of the float unit 5. Prior to this activation, e.g. only the receiver unit 16 of the float unit 5 is active in order to be able to receive this wake up and/or activating signal. This way, very low energy consumption of the float unit 5 is achieved. For this purpose, the receiver unit 16 may be a low power receiver, i.e. in particular a receiver unit 16 with low energy consumption. After the wake up and/or activating signal, the transmitter unit 14 of the submersible unit 2 transmits the determined pressure value which is received by the receiver unit 16 of the float unit 5. Simultaneously, the further pressure sensor unit 6 of the float unit 5 measures a pressure value.

Now, either the further controller 22 of the float unit 5 acting as a determination unit calculates the filling level h from these pressure values of the submersible unit 2 and of the float unit 5, which filling level h is then transmitted to the reader unit 11 by means of the further transmitter unit 15 of the float unit 5, or the determined pressure values of the submersible unit 2 and of the float unit 5 are transmitted to the reader unit 11 by means of the further transmitter unit 15 of the float unit 5 and the filling level h is determined from these pressure values in the reader unit 11, for which purpose the reader unit 11 comprises a suitable determination unit.

The further controller 22 of the float unit 5 may optionally also be configured as a logger, also referred to as a data logger, for both pressure sensor units 3, 6, in particular to initially collect a data packet comprising in particular multiple pressure values determined by means of the pressure sensor units 3, 6, and then to transmit this data packet to the reader unit 11, e.g. upon request from the reader unit 11. In this case, the further controller 22 comprises a sufficiently big data memory, in particular with a memory size of more than 1 Mbyte. Moreover in this case, the submersible unit 2 and/or the float unit 5 may comprise a real time clock; in particular e.g. at least the submersible unit 2 comprises a real time clock. For example, the clock 17 is configured as a real time clock.

Thus in this case, the submersible unit 2 comprises the real time clock and the float unit 5 comprises the memory unit in the form of the further controller 22, in particular for storing determined pressure values, in particular together with a respective point in time of the determination. In an exemplary embodiment, the submersible unit 2 then determines at least one pressure value by means of its pressure sensor unit 3 and determines the point in time of the determination of this pressure value by means of its real time clock, and transmits these data, e.g. together with its unambiguous identification, to the float unit 5. When receiving these data and/or a preceding wake up and/or activation signal of the submersible unit 2, the receiver unit 16 of the float unit 5 activates the rest of the circuit, whereupon at least one pressure value is determined by means of the further pressure sensor unit 6 of the float unit 5. Then, the data received by the submersible unit 2 are stored together with this pressure value determined by the float unit 5 and for example with their unambiguous identification as a data packet in the controller 22. This way, further data of this type may be stored in the controller 22 over the course of time, e.g. within the same data packet or within multiple data packets. Then, the controller 22 transmits the data packet or the multiple data packets to the reader unit 11, e.g. autonomously, for example at one or more predetermined points in time, and/or upon request from the reader unit 11.

The controller 18 and/or the controller 22 is/are in particular configured as a computer in each case.

LIST OF REFERENCES

1 device
2 submersible unit
3 pressure sensor unit
4 submersible body
5 float unit
6 further pressure sensor unit
7 floating body
8 gas bubble
9 material
10 swimming ring
11 reader unit
12 antenna
13 further antenna
14 transmitter unit
15 further transmitter unit
16 receiver unit
17 clock
18 controller
19 battery
20 driver
21 modulator
22 further controller
23 further battery
B container
BB bottom
F liquid
h filling level
ho height below the surface
hu height above the bottom
O surface

What is claimed is:

1. A device for determining a filling level of a liquid in a container, the device comprising a submersible unit communicatively connected to a float unit,
   the submersible unit having:
      a pressure sensor unit,
      a transmitter unit,
   the float unit having:
      a floating body,
      a further pressure sensor unit, and
      a further transmitter unit configured as a radio transmitter unit,
   wherein the further pressure sensor unit is arranged at or in the floating body in such a manner that, when the float unit is arranged in the liquid, the further pressure sensor unit is arranged below the surface of the liquid,
   wherein
      the transmitter unit of the submersible unit is configured as an ultrasonic transmitter unit and the float unit comprises a receiver unit configured as an ultrasonic receiver unit,
   or
      the transmitter unit of the submersible unit is configured as a light signal transmitter unit and the float unit comprises a receiver unit configured as a light signal receiver unit.

2. The device according to claim 1, further comprising a reader unit communicatively connected to the floating unit.

3. The device according to claim 1, wherein the float unit comprises a determining unit for determining a filling level of the liquid in the container from a pressure value determined by the pressure sensor unit of the submersible unit and from a pressure value determined by the further pressure sensor unit of the float unit.

4. The device according to claim 2, wherein the reader unit comprises a determining unit for determining a filling level of the liquid in the container from a pressure value determined by the pressure sensor unit of the submersible unit and from a pressure value determined by the further pressure sensor unit of the float unit.

5. The device according to claim 1, wherein the further transmitter unit of the float unit configured as a radio transmitter unit is a Bluetooth Low Energy transmitter unit.

6. The device according to claim 1, wherein at least one of the pressure sensor unit and the further pressure sensor unit is configured as a MEMS sensor.

7. The device according to claim 1, wherein at least one of the submersible unit and the float unit is at least in sections formed from a magnetizable material.

8. The device according to claim 7, wherein the magnetizable material is a magnetizable metal.

9. The device according to claim 1, wherein the float unit is at least partially filled with one of a gas and a gas mixture.

10. The device according to claim 9, wherein the gas mixture is air.

11. The device according claim 1, wherein at least one of the submersible unit and the float unit comprises a real time clock and a memory unit for storing determined pressure values together with a respective point in time of the determination.

* * * * *